(12) United States Patent
Sarda

(10) Patent No.: US 7,999,645 B2
(45) Date of Patent: Aug. 16, 2011

(54) MAGNETIC HOLDING APPARATUS FOR HOLDING WORKPIECES

(75) Inventor: Uttam Sarda, Kolkata (IN)

(73) Assignee: East Coast Enterpriser Ltd, Calcutta (IN)

( * ) Notice: Subject to any disclaimer, the term of this patent is extended or adjusted under 35 U.S.C. 154(b) by 0 days.

(21) Appl. No.: 12/692,395

(22) Filed: Jan. 22, 2010

(65) Prior Publication Data
US 2010/0117773 A1    May 13, 2010

Related U.S. Application Data

(63) Continuation of application No. 11/977,311, filed on Oct. 24, 2007, now abandoned.

(30) Foreign Application Priority Data

Apr. 25, 2005  (IN) .............. 345/KOL/2005
Sep. 26, 2005  (IN) .............. 883/KOL/2005

(51) Int. Cl.
*H01F 7/20* (2006.01)
*B25B 1/22* (2006.01)

(52) U.S. Cl. .............. 335/289; 335/285; 269/85

(58) Field of Classification Search .......... 335/285–287, 335/289; 269/8–9, 85
See application file for complete search history.

(56) References Cited

U.S. PATENT DOCUMENTS

| 687,931 | A | * | 12/1901 | Barr .............................. 335/289 |
| 2,676,413 | A | * | 4/1954 | Wharton et al. ................. 33/573 |
| 3,967,816 | A | * | 7/1976 | Ramsperger et al. ............ 269/9 |
| 4,075,589 | A | | 2/1978 | Braillon |
| 4,497,412 | A | * | 2/1985 | Labelle ........................ 211/70.7 |
| 4,507,635 | A | | 3/1985 | Cardone et al. |
| 4,684,112 | A | * | 8/1987 | Chernikov et al. ............... 269/8 |
| 4,691,183 | A | * | 9/1987 | Vernikov et al. ............... 335/289 |
| 4,777,463 | A | * | 10/1988 | Cory et al. ..................... 335/289 |
| 4,837,540 | A | * | 6/1989 | Michele et al. ............... 335/286 |
| 5,931,726 | A | * | 8/1999 | Peters .......................... 451/305 |
| 6,278,350 | B1 | * | 8/2001 | Dorner ......................... 335/289 |
| 6,489,871 | B1 | * | 12/2002 | Barton ......................... 335/285 |

FOREIGN PATENT DOCUMENTS

| DE | 4111978 | 5/1992 |
| DE | 19621970 | 12/1996 |
| EP | 0254939 | 2/1988 |
| EP | 0594905 A1 | 5/1994 |
| FR | 2548945 | 1/1985 |
| GB | 2178902 | 2/1987 |

* cited by examiner

*Primary Examiner* — Elvin G Enad
*Assistant Examiner* — Alexander Talpalatskiy
(74) *Attorney, Agent, or Firm* — Bracewell & Giuliani LLP

(57) ABSTRACT

An electro permanent magnetic apparatus with monolithic working face for holding workpieces magnetically or mechanically comprises a base plate and a ferrous monolithic working face. The base plate has a pocket or recess which houses reversible magnets and electrical windings; the working face has magnetic poles which are demarked by slots. On the opposite side of the working face recesses are provided beneath the slots for housing non-reversible permanent magnets.

20 Claims, 5 Drawing Sheets

MAGNETIC HOLDING APPARATUS FOR HOLDING WORKPIECES

RELATED APPLICATIONS

This application is a continuation application of Ser. No. 11/977,311, filed Oct. 24, 2007, which claims the benefit of International Patent Application PCT/IN2006/000118, filed on Apr. 6, 2006, which claims the benefit of national Indian applications 345/KOL/2005 and 883/KOL/2005, filed on Apr. 25, 2005 and Sep. 26, 2005, respectively, which hereby are incorporated by reference in their entirety.

BACKGROUND OF THE INVENTION

The present invention relates to an electro permanent magnetic work holding apparatus for holding workpieces magnetically and/or mechanically. This invention more particularly relates to an electro permanent magnetic (hereinafter abbreviated as 'EPM' in this specification for the sake of brevity and convenience) work holding apparatus having a monolithic ferrous working face with slots of desired shape and configuration separating the magnetic poles, thereby rendering the apparatus suitable for holding the workpieces both magnetically and/or mechanically in the course of working/machining/anchoring. Usually such slots are made around the perimeter of the poles, thereby minimizing reduction in active magnetic area of the working face. The subject invention also pertains to a work holding apparatus with at least one non-reversible permanent magnet, and at least another reversible permanent magnet suitably placed, which may be commissioned for work holding by switching electrically, whereby a workpiece material is held in place without the use of additional pole separators.

In metal working machines such as CNC machining centers, milling machines, electrical discharge machines (EDM), grinding machines, etc., a magnetic work holding apparatus is often used as a worktable, whereby a workpiece to be machined can be held securely on the worktable by magnetic force, and then machining operation may be performed on the workpiece.

The principal property of a magnet is its capability to attract ferromagnetic materials resulting from flow of magnetic energy called "flux" between magnetic north and south poles. When a ferromagnetic workpiece is placed across the poles of a magnet, the "flux" passes through and the workpiece gets attracted. The intensity of attraction or pull becomes stronger with the decrease in the distance of separation between the workpiece and the magnet. Moreover, strength of attraction of a magnet is the function of the quantum of induction of magnetic flux into the workpiece. It has also been observed that smooth surfaces are better attracted and held in position in comparison to uneven or rough surface.

In the prior art, Electro permanent magnetic (EPM) work holding apparatuses of flux reversal type are known in which a magnetic circuit is activated or deactivated by reversing the poles of the permanent magnets of the device. This is a combination of permanent magnetic and electro magnetic devices: it presents the advantages of the latter without the disadvantages of the former. These devices uses intrinsic energy of the permanent magnetic device but instead of being switched "ON" or "OFF" mechanically, it requires electrical pulse similar to electro magnetic devices but only momentarily delivered by an electrical winding. Once switched "ON", these devices provide magnetic force for infinite duration of time independent of any external energy source. For instance, U.S. Pat. No. 4,507,635 granted to Michele Cardone of Milan, Italy, pertains to a magnetic anchoring apparatus, comprising in combination: an external ferromagnetic crown provided with a base plate and lateral walls; at least one group of four pole pieces defining pairs of corresponding poles of an anchoring surface, said pole pieces presenting their longitudinal axes at right angles to the base place and in correspondence with the apexes of a square. Moreover, the apparatus comprises a plurality of permanent magnets for feeding the aforesaid poles, interposed between the pole pieces, and between the latter and said ferromagnetic crown.

Types of magnets presently available have magnetic poles (north and south) which are separated by non-magnetic insulators between the individual poles. The magnetic insulating material generally used may be selected from the group of epoxy, aluminum, brass, stainless steel, etc.

As the coefficient of thermal expansion of each material is different, the working surface of the existing magnetic work holding device is not stable when there is a rise in temperature during machining operation. This difference causes unstable surface and often creates small opening(s) for coolant (sometimes flooded coolant fluid is used during machining) to enter inside the work holding device and short circuit the winding/joints or hamper with the insulation resistance of the winding.

Normally in this conventional work holding device, all poles are individually machined and assembled, which gives rise to a possibility of the presence of weak points on the top working face. Moreover as multiple numbers of pieces are to be handled, it makes the manufacturing process difficult and time consuming.

It is impractical to repair these chucks as any process of repair cannot begin without destroying the chuck.

Moreover, another drawback of the conventional magnetic work holding apparatus is that it cannot be used for holding diamagnetic or paramagnetic workpieces, as a result of which they normally had to be removed from the working bed of the machine or a holding means such as a clamp or vice had to be mounted on top of the apparatus to hold diamagnetic or paramagnetic jobs or workpieces. Any other provision for clamping the workpiece also significantly reduces the active magnetic area of the working face.

As pointed out earlier, structural stability of prior art systems was not satisfactory, particularly while carrying on heavy machining applications. The filler material, usually epoxy compound, also was a source of problems, as it led to unequal heating of the work holding surface posing accuracy problems. Leakage of the coolant into the magnets affected the performance of the apparatus.

The present invention aims at circumventing and finding an effective solution to the difficulties mentioned above.

SUMMARY OF THE INVENTION

It is a first object of the invention to disclose a novel dual purpose magnetic and mechanical workpiece holding apparatus for machining or working or anchoring workpieces which may be ferromagnetic, diamagnetic or even paramagnetic.

It is a second object of the invention to disclose a workpiece holding apparatus having a monolithic ferrous working face with slots separating the magnetic poles.

It is a third object of the invention to disclose a workpiece holding apparatus having a monolithic ferrous working face having "T" slots for insertion of clamping-cum-holding device to hold diamagnetic or paramagnetic workpieces for being worked upon.

It is a forth object of the invention to disclose an EPM workpiece holding apparatus having a monolithic working face wherein there are provided a plurality of slots resembling inverted "T" (tee-slots) or a truncated dumb-bell across the entire length and/or width of the apparatus which separate the magnetic poles and simultaneously can be used to clamp jobs mechanically for being worked upon.

Yet another object of this invention is to disclose a magnetic work holding apparatus with a ferrous monolithic working face capable of being used for anchoring of ferrous metal parts, components or entire apparatus magnetically.

These and other objects are achieved by the invention which relates to an EPM work holding apparatus for holding workpieces magnetically and/or mechanically, comprising of a base plate and a ferrous monolithic working face, the said base plate having a pocket or recess which houses the reversible permanent magnets and electrical windings, the said working face having magnetic poles which are demarked by slots, and on the opposite side of the said working face recesses are provided beneath the said slots for housing the non-reversible permanent magnets.

The present invention successfully solves the above problems by recasting the design of the work holding equipment by machining out the top working face and the side walls from a monolithic ferrous block, which renderes the structure quite rigid.

The monolithic structure of the subject invention also has recesses for demarking the magnetic poles, which eliminates the need to use any filler material. Furthermore, instead of a plurality of pole pieces required in conventional designs depending on the number of poles, only a single ferrous block needs to be handled, which makes the manufacture quite easy.

The work holding device is usually provided with tee-slots, resembling an inverted Tee, running across the length and/or width of the work holding apparatus, which not only separate the magnetic poles but also enables workpieces or jobs to be held either magnetically and/or mechanically.

The slots may also be made in the shape of a truncated dumb-bell in lieu of a tee-slot, or any other suitable shape for convenience of operation/anchoring, the latter being preferred for convenience of operation and easy availability of clamping equipments.

Usually such slots extend around the perimeter of the poles, thereby minimizing reduction in active magnetic area of the poles. Tee-slots enable diamagnetic or paramagnetic materials like brass, aluminum, stainless steel, copper, etc. to be clamped and worked upon.

The main advantages of the present invention may be briefly summarized as follows:

(1) The presence of slots, preferably configured as "T" slots, enables secure handling of workpieces even for diamagnetic or paramagnetic substances, holding them mechanically.

(2) All poles and sidewalls are well-connected being made from a monolithic ferrous block, which adds stability to the structure.

(3) The working face is entirely leak-proof and no liquid/coolant can seep in from the top working face.

(4) The need to use filler material on top is dispended with as the working face is fabricated from a monolithic block of ferromagnetic material, on which magnetic poles are well-marked.

(5) As the working face of the subject apparatus is fabricated from a single block of ferromagnetic material, the heat generated during machining operation like milling, shearing, grinding, etc. is evenly distributed throughout the work holding surface, thereby substantially reducing any possibility of unequal deformation.

(6) The slots are made around the perimeter of the poles which ensures minimum reduction of active magnetic area.

(7) Repairing of electrical winding pose no problem or difficulty as the winding can be easily accessed by mere separation of the base and the top working face.

(8) This ensures a simplified manufacturing of magnetic circuit which normally separate adjacent magnetic poles of different polarities resulting in a considerable reduction of manufacturing costs and with better performance.

BRIEF DESCRIPTION OF THE DRAWINGS

The invention will now be described with reference to preferred embodiments which are illustrated in the enclosed drawings which shall be merely of illustrative character without limiting the scope of the invention in any way. In the drawings.

DETAILED DESCRIPTION OF THE PREFERRED EMBODIMENTS

Figure 1:
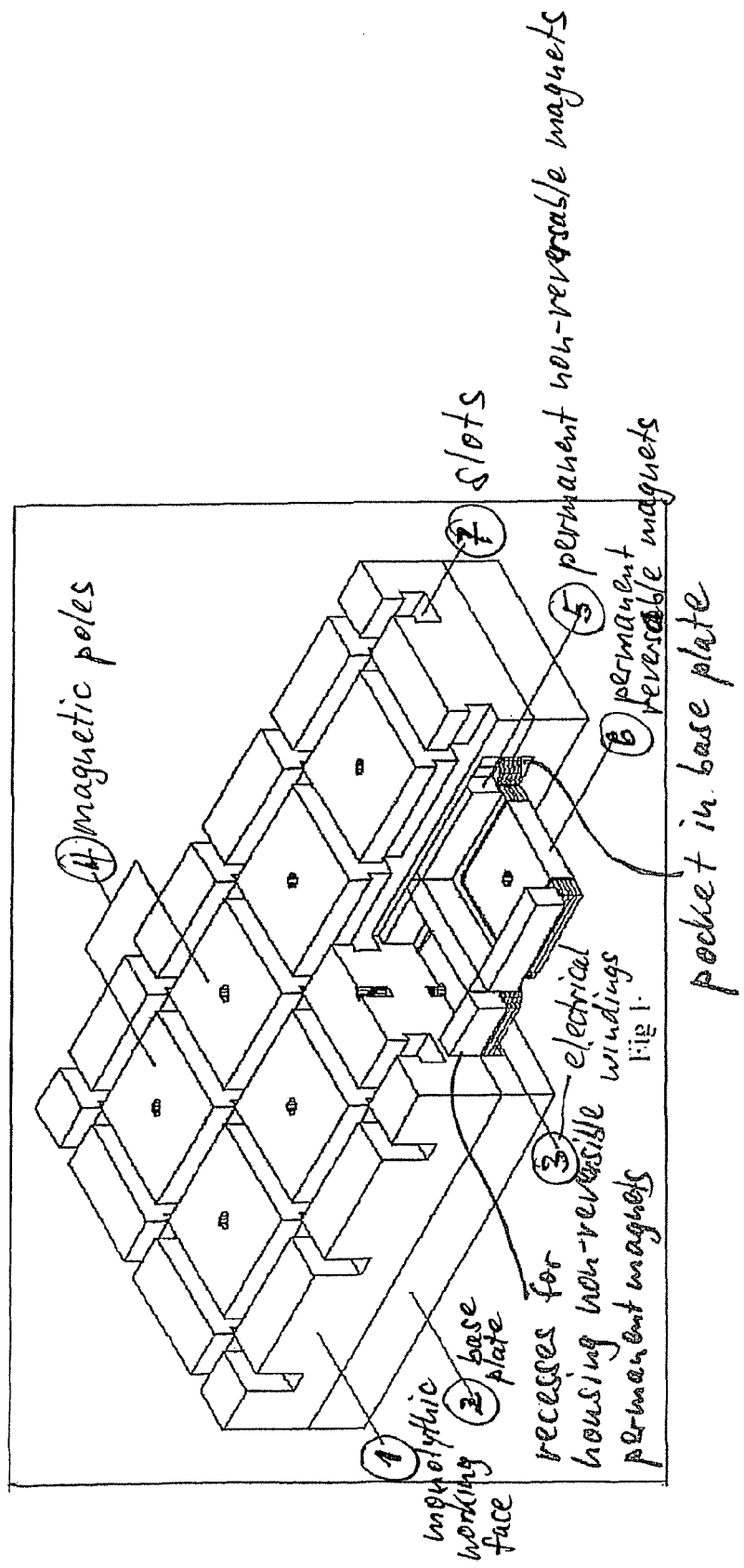
FIG. 1 shows a longitudinal cross-sectional view of a work holding apparatus according to the invention.

Referring to the aforementioned figures of the drawings, in FIG. 1 an electromagnetic permanent magnetic apparatus according to the invention the shown. It comprises a work holding face 1, a base plate is 2, the electrical windings 3, demarked magnetic poles 4, a first set of permanent, but reversible magnets 6, and a second set of permanent, non-reversible, magnets are designated by 5. The work holding face 1 also comprises slots 7 which may be shaped as tee-slots running across the length and/or width of the work holding apparatus, which are brought into play while dealing with a diamagnetic or paramagnetic job or workpiece.

Figure 2:
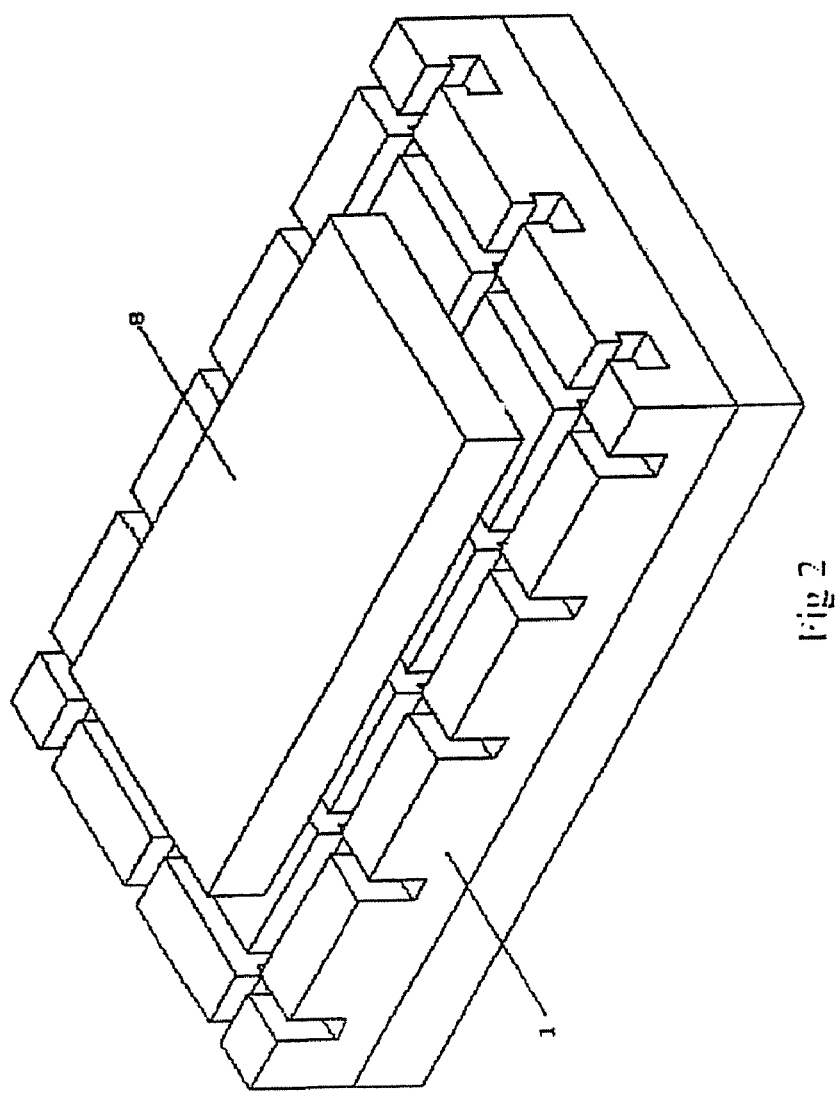
FIG. 2. gives a view of the electro permanent work holding apparatus according to the invention holding magnetically a ferromagnetic workpiece.

In FIG. 2 the electromagnetic permanent magnetic apparatus according to the invention is shown holding a ferrous job or workpiece 8 magnetically, obviating the need to deploy additional mechanical holding means.

Figure 3:
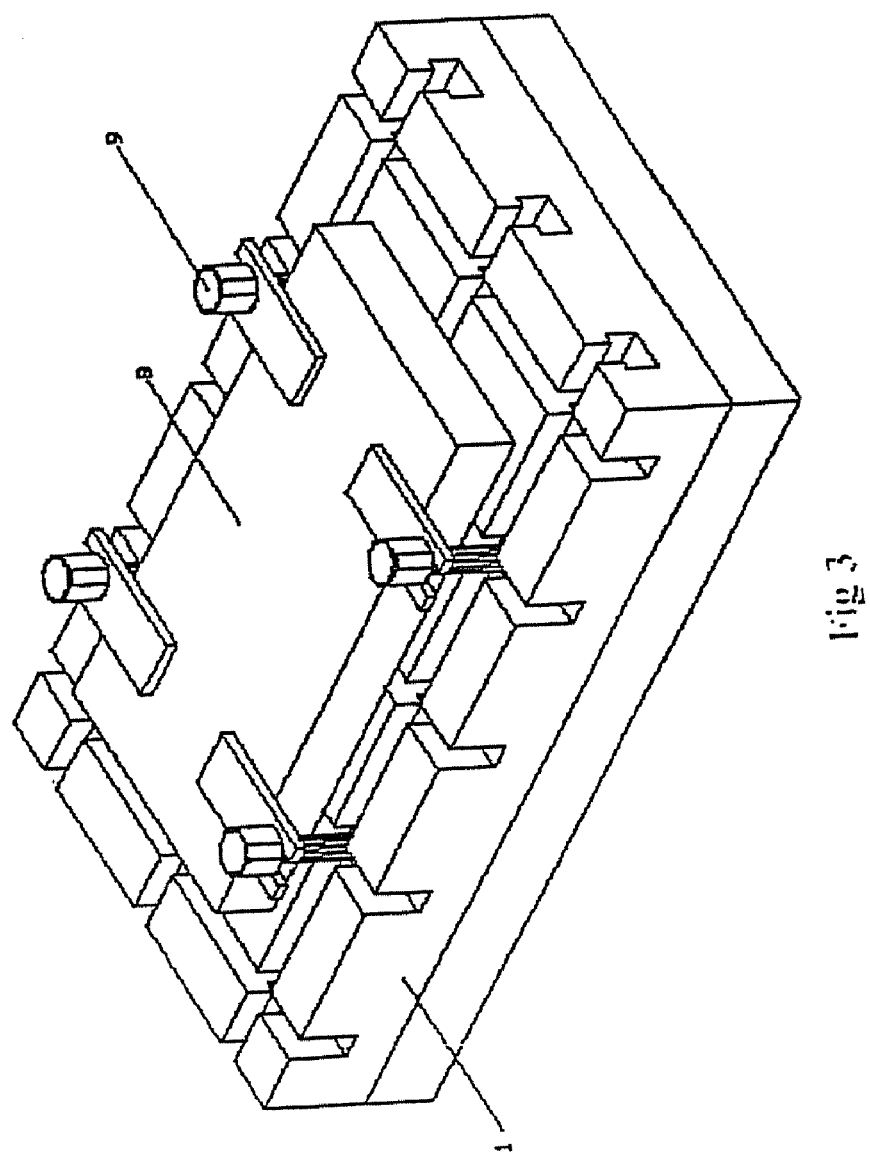
FIG. 3. depicts a view of the electro permanent work holding apparatus according to the invention holding a workpiece with the help of mechanical clamps.
Figure 4:
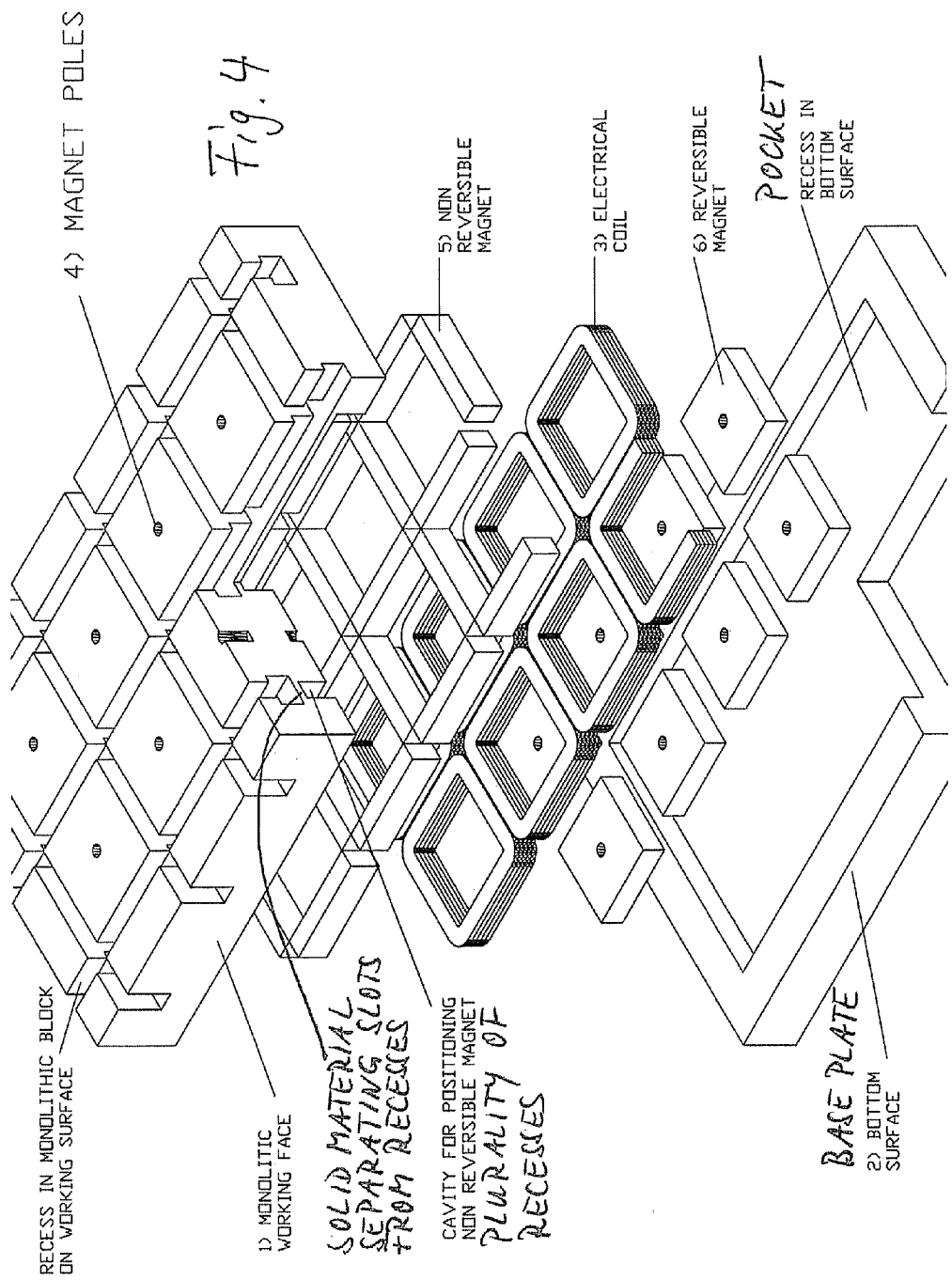
FIG. 4 shows an exploded view of the work holding apparatus according to the invention.
Figure 5:
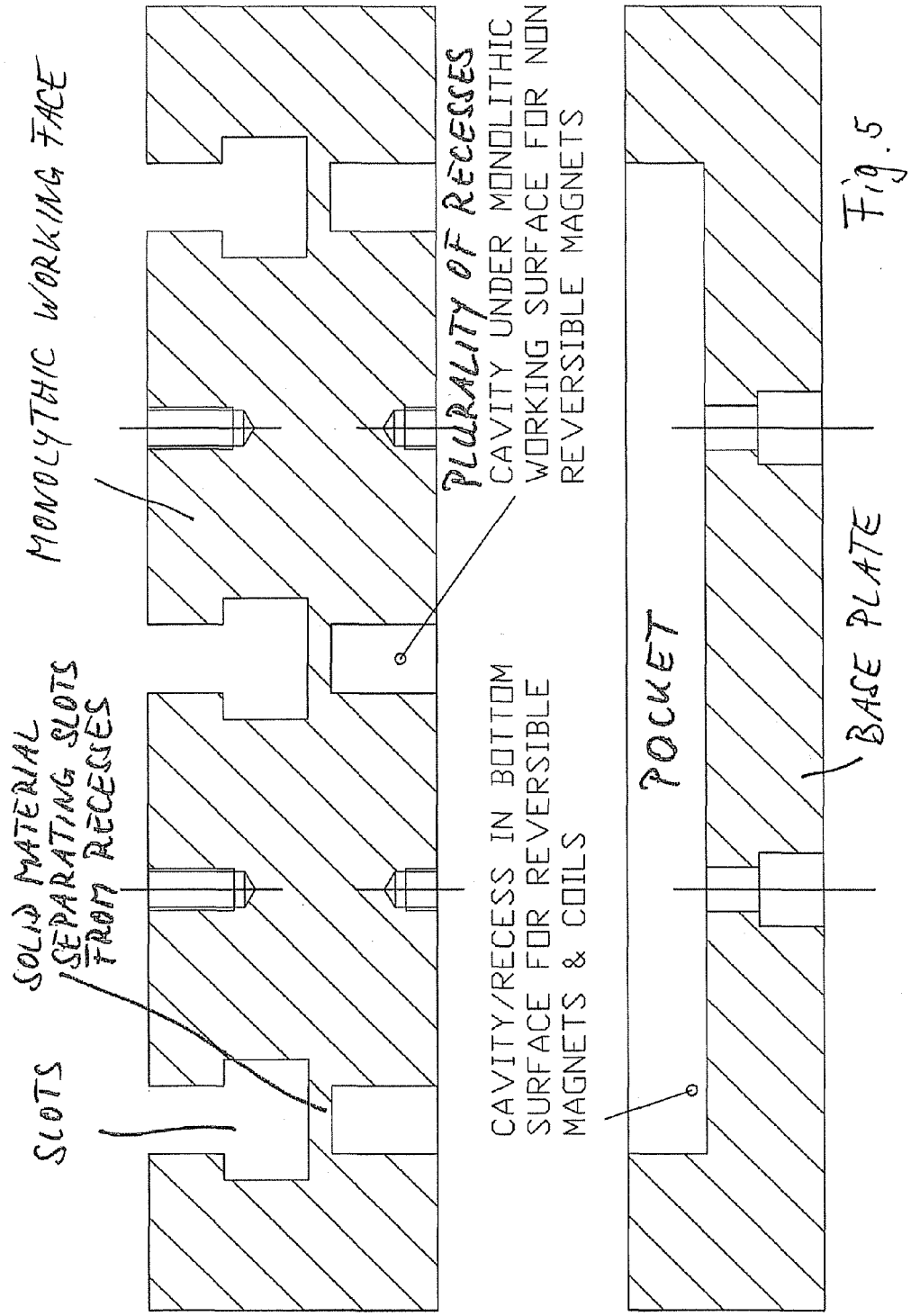
FIG. 5 shows a cross-sectional view of the work holding apparatus according to the invention.

In FIG. 3 the electromagnetic permanent magnetic apparatus according to the invention is shown holding a diamagnetic or paramagnetic job or workpiece 8 with the help of mechanical clamps 9.

From the foregoing it may be seen that the magnetic bed of this invention could also be used as a machine bed, thereby enhancing the life of the original machine bed.

The working face of the holding apparatus is obtained from a monolithic block of ferromagnetic material, wherein the poles are demarked by making slots in the said block, obviating the need to use filler material(s).

Moreover, instead of using numerous pole pieces depending on the number of poles as was being used earlier, only a single block of ferromagnetic material needs to be handled in the present instance, rendering its manufacture relatively simple, yet sturdy and stable.

Another embodiment of the present invention resides in a magnetic work holding apparatus, which is a variant of the electro permanent magnetic work holding apparatus as described and illustrated hereinabove, equipped with a monolithic working face of a ferromagnetic material capable of being used for anchoring/hoisting of ferrous metal parts, components or whole machine. The said variant electro permanent magnetic work holder suitable for holding ferromagnetic objects, having at least two poles, each one of which has a non-reversible permanent magnet and a reversible permanent magnet surrounded by an electrical winding which is used for effecting reversal of the magnetic poles of the reversible magnet.

This apparatus is obtained from two pieces of ferromagnetic material, one serving as the top working face and the other as base plate, wherein poles are demarcated in the top working face of the work holder by making recesses in the monolithic block and cavities are made on the opposite side of the poles for locating/positioning reversible and non-reversible permanent magnets, the former being placed on the backside of the pole surrounded by an electrical winding and the latter are placed on the surface nearest the top working face. The top working face provides a stable and leak-proof working surface.

A second monolithic ferrous surface may be introduced in such a manner that it holds the reversible permanent magnets between the poles and base plate in a sandwiched manner and on the base plate pockets are made for housing the non-reversible permanent magnets directly below the demarcated poles.

In FIG. 1, the monolithic ferrous working face 1 has two sets of permanent magnets assembled beneath it. The magnetic orientation of one of the sets, called reversible permanent magnets 6 is reversed electrically using the electrical windings 3 around it, depending upon whether to clamp the ferromagnetic job (called ON condition) or to release the ferromagnetic job (called OFF condition). The second set of permanent magnets called non-reversible permanent magnets 5, which are not reversed, are placed between the poles 4. The base plate 2 has a plurality of recesses which house the reversible permanent magnets 6 in such a way that they are sandwiched between the working face 1 and the bottom plate 2.

Additional modifications and improvements of the present invention may also be apparent to those skilled in the art. Thus the particular combination of parts described and illustrated herein is intended to represent only one embodiment of this invention with a variation and is not intended to serve as limitation of alternative devices or features within the spirit and scope of the invention.

Having described the inventions in detail with particular reference to the illustrative drawings accompanying both provisional and complete specifications, it will now be made more specifically defined by the claims appended hereafter.

What is claimed is:

1. A magnetic holding apparatus for holding workpieces comprising:
   a base plate made of a ferroelectric material;
   a working face made of a monolithic block of ferroelectric material, being arranged above said base plate and having an outer surface configured for supporting workpieces;
   a plurality of recesses provided within said working face;
   a pocket provided within said base plate;
   a plurality of reversible permanent magnets received within said pocket;
   a plurality of electrical windings received within said pocket together with said reversible permanent magnets configured for reversing said reversible permanent magnets upon application of an electrical current flowing through said electrical windings;
   a plurality of magnetic poles formed within said working face demarked by slots extending from said outer surface of said working face toward said base plate;
   a plurality of non-reversible permanent magnets received below said slots within said recesses;
   wherein said non-reversible permanent magnets are configured for magnetically clamping workpieces by magnetic flux extending through said magnetic poles and through said workpieces;
   wherein said recesses are separated from said slots by solid material of said working face; and
   wherein said reversible permanent magnets are configured for either substantially neutralizing said magnetic flux of said non-reversible permanent magnets upon activating said electrical windings with a first electrical current, thereby allowing removal of a workpiece, or for transferring said magnetic flow of said non-reversible permanent magnets through said magnetic poles to said workpiece for magnetic clamping thereof.

2. The magnetic holding apparatus of claim 1, wherein said slots are configured for mechanical clamping of workpieces supported upon said outer surface of said working face.

3. The magnetic holding apparatus of claim 1, further comprising clamps supported within said slots for mechanically clamping workpieces supported upon said working surface.

4. The magnetic holding apparatus of claim 1, wherein said working face comprises quadrangular sections demarking said magnetic poles.

5. The magnetic holding apparatus of claim 1, wherein said slots are configured as tee-slots separating said magnetic poles and enabling a securing of clamp means for mechanically holding workpieces.

6. The magnetic holding apparatus of claim 1, wherein said slots are configured as truncated dumb-bell shaped slots.

7. The magnetic holding apparatus of claim 1, wherein said slots extend around a perimeter of said poles, ensuring minimum reduction in active magnetic area of said working face.

8. The magnetic holding apparatus of claim 1, wherein said holding apparatus is configured for clamping ferroelectric workpieces magnetically and for clamping diamagnetic or paramagnetic workpieces mechanically.

9. The magnetic holding apparatus of claim 1, wherein said holding apparatus is configured as a machine bed.

10. A magnetic holding apparatus for holding workpieces comprising:
    a base plate made of a ferroelectric material;
    a working face made of a monolithic block of ferroelectric material, being arranged above said base plate and having an outer surface configured for supporting workpieces;
    a plurality of first recesses provided within said working face;
    a pocket provided underneath said first recesses;
    a plurality of permanent reversible magnets received within said pocket;
    a plurality of electrical windings received within said pocket together with said permanent reversible magnets;
    a plurality of magnetic poles formed within said monolithic working face demarked by slots extending from said outer surface of said working face toward said base plate; and a plurality of non-reversible permanent magnets received within said recesses and being separated from said slots by solid material of said working face.

11. The magnetic holding apparatus of claim 10, wherein said non-reversible permanent magnets are configured for magnetically clamping workpieces by magnetic flux extending through said magnetic poles.

12. The magnetic holding apparatus of claim 10, wherein said working face comprises quadrangular sections demarking said magnetic poles.

13. The work holding apparatus of claim 10, wherein said slots are configured as tee-slots separating said magnetic poles and enabling a securing of clamp means for mechanically holding workpieces.

14. The work holding apparatus of claim 10, wherein said slots are configured as truncated dumb-bell shaped.

15. The work holding apparatus of claim 10, wherein said slots extend around a perimeter of the poles, ensuring minimum reduction in active magnetic area of said working face.

16. The work holding apparatus of claim 10, wherein said holding apparatus is configured as a machine bed suitable for clamping ferroelectric workpieces magnetically and for clamping diamagnetic or paramagnetic workpieces mechanically.

17. The magnetic work holding apparatus of claim 10 comprising at least two poles, each one of which having a non-reversible permanent magnet and a reversible permanent magnet surrounded by an electrical winding which is used for effecting reversal of magnetic polarity of said reversible permanent magnets.

18. A magnetic holding apparatus for holding workpieces comprising:
- a base plate made of a ferroelectric material;
- a working face made of a monolithic block of ferroelectric material, being arranged above said base plate and having an outer surface configured for supporting workpieces;
- a plurality of recesses provided within said working face;
- a pocket provided underneath said first recesses;
- a plurality of permanent reversible magnets received within said pocket;
- a plurality of electrical windings received within said pocket together with said permanent reversible magnets;
- a plurality of magnetic poles formed within said monolithic working face demarked by slots extending from said outer surface of said working face toward said base plate; and
- a plurality of non-reversible permanent magnets received within said recesses and being separated from said slots by solid material of said working face; wherein said working face comprises quadrangular sections demarking said magnetic poles.

19. The work holding apparatus of claim 10, wherein
- said recesses and said pocket are located within said working surface;
- said base plate is configured to hold said reversible permanent magnets between said poles and said base plate in a sandwiched manner; and
- said recesses are configured for housing said non-reversible permanent magnets directly below said demarcated poles.

20. The work holding apparatus of claim 18, wherein said slots are configured for mechanical clamping of workpieces supported upon an outer surface of said working face.

* * * * *